No. 713,681. Patented Nov. 18, 1902.
W. W. PICKORN.
COMBINATION SEED DROPPER AND DISTRIBUTER.
(Application filed Sept. 27, 1901.)
(No Model.)
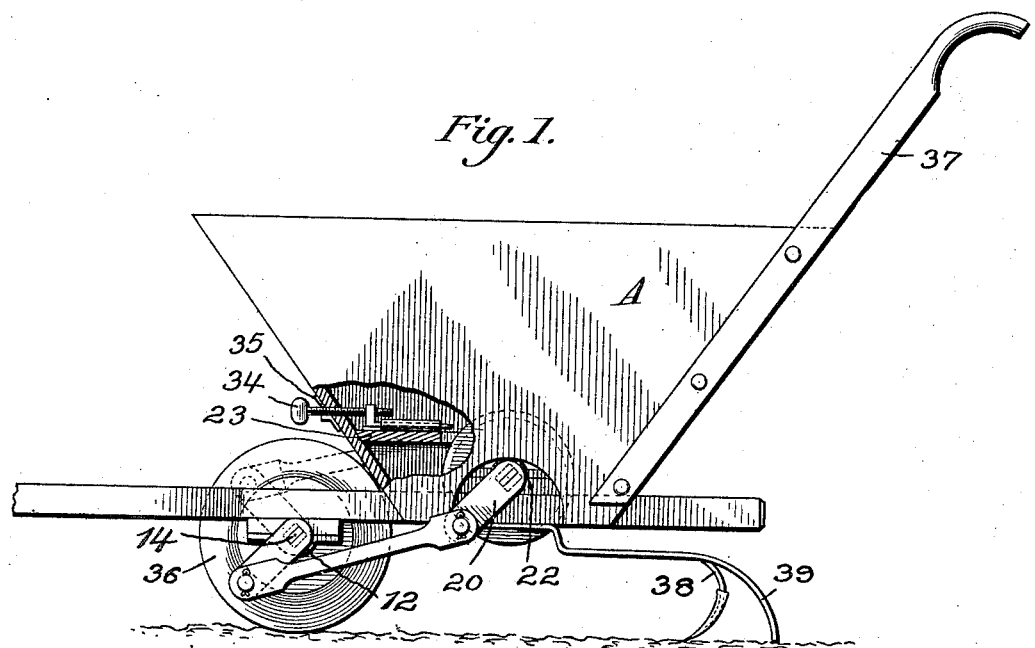
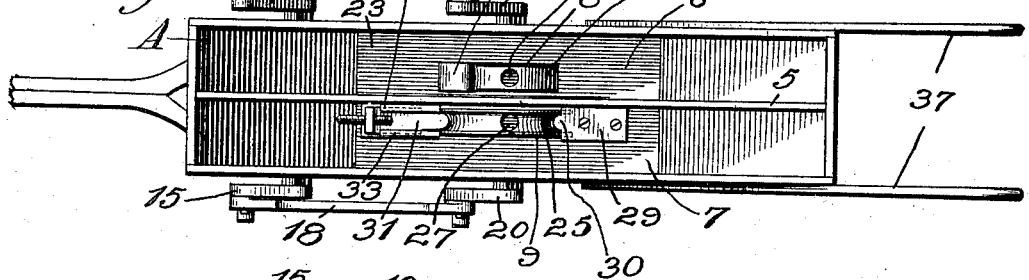
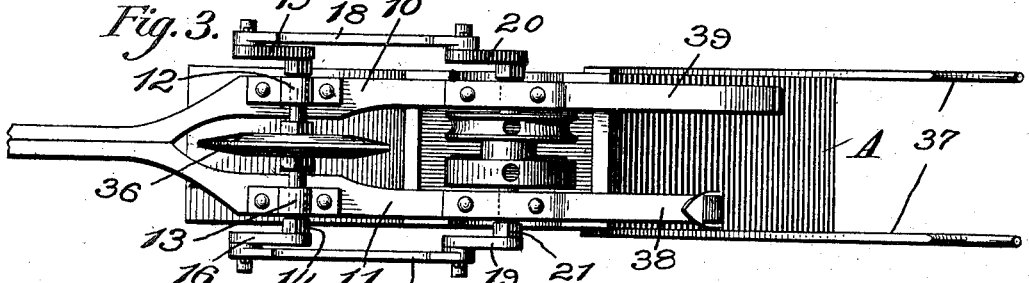
Witnesses:
Inventor:
Wm. W. Pickorn

UNITED STATES PATENT OFFICE.

WILLIAM W. PICKORN, OF GRACEVILLE, FLORIDA.

COMBINATION SEED DROPPER AND DISTRIBUTER.

SPECIFICATION forming part of Letters Patent No. 713,681, dated November 18, 1902.

Application filed September 27, 1901. Serial No. 76,812. (No model.)

*To all whom it may concern:*

Be it known that I, WILLIAM W. PICKORN, a citizen of the United States, residing at Graceville, in the county of Jackson, State of Florida, have invented certain new and useful Improvements in Seed Droppers and Distributers; and I do hereby declare the following to be a full, clear, and exact description of the invention, such as will enable others skilled in the art to which it appertains to make and use the same.

This invention relates to implements for dropping seeds and distributing fertilizers; and it has for its object to provide a simple, cheap, and efficient implement of this nature by means of which the seeds may be dropped at regular intervals and in proper quantity and from which the fertilizer will be distributed in proper quantity and without waste and in which the quantity of fertilizer distributed may be varied to suit different conditions.

Other objects and advantages of the invention will be understood from the following description.

In the drawings forming a portion of this specification, and in which like characters of reference indicate similar parts in the several views, Figure 1 is a side elevation showing the present invention, portions of hopper being broken away to better show the structure. Fig. 2 is a top plan view of the implement. Fig. 3 is a bottom plan view of the implement.

Referring now to the drawings, the present implement comprises a hopper A, which is divided by the vertical partition 5, extending longitudinally thereof to form a compartment 6 and 7, in the bottoms of which are formed openings 8 and 9, respectively. The hopper is mounted upon the beams 10 and 11, which converge at the forward end of the hopper and beyond which convergent portions they lie in contact, as shown. On the under sides of the beams 10 and 11 are secured bearings 12 and 13, in which is mounted a shaft 14, having cranks 15 and 16 at its ends and which cranks are connected by pitmen 17 and 18 with the cranks 19 and 20 of a crank-shaft 21, mounted in bearings 22 on the beams 10 and 11 and within the lower portion of the hopper. The hopper has a false bottom 23, which is spaced upwardly from the beams 10 and 11 and in which the openings 8 and 9 are formed.

Upon the shaft 21 are fixed the two disks 24 and 25, the former having a plain periphery in which are formed pockets 26, while the disk 25 is grooved circumferentially, the groove being arc shape in cross-section, and in the bottom of this groove are formed pockets 27.

Secured to the bottom 23 of the hopper is a spring-plate 28 between the disk 24 and the front of the hopper, it being understood that the disk 24 projects through the opening or slot 8 in the false bottom, and the plate 28, which is arc-shaped, lies against the periphery of the disk and prevents crowding of the seeds in the section 6 of the hopper into the opening 8 at the front end thereof when the disk is rotated, it being understood that the section 6 of the hopper carries the seeds to be dropped.

In the section 7 of the hopper is placed the fertilizer, which as the disk 25 is rotated enters the pockets 27 and is carried by the pocket through the bottom of the hopper and then discharged upon the ground. To prevent wasting of the fertilizer between the disk and the rear end of the opening 9, a plate 29 is secured to the upper face of the bottom 23 and has an arc-shaped lug 30 at its forward end, which engages in and completely fills transversely the peripheral groove of the disk.

The use of the peripheral groove is to permit a continuous stream of fertilizer passing from the hopper when desired, and to regulate or cut off this stream a valve-plate 31 is provided and is slidably mounted in the guides 32, secured to the bottom 23. The rear end of the plate 31 is arc-shaped, so that it may fit in the peripheral groove of the disk 25, and the opposite end of the plate is upturned, as shown, and is provided with a threaded perforation, in which is engaged a thumb-screw 34, which is engaged also with a threaded perforation in the plate 35, secured to the front face of the hopper, there being a perforation in the front wall of the hopper to receive the thumb-screw. By manipulation of the thumb-screw the plate 31 may be moved toward and away from the disk to vary the feed of fertilizer through the bottom of the hopper, as will be understood.

To rotate the disks, a wheel 36 is fixed upon the shaft 14 midway of the ends thereof, so that when the implement is moved along the shaft, and therewith the wheel, will be rotated.

To the sides of the hopper are secured the handles 37, and to the under sides of the beams 10 and 11 are secured spring-plates 38 and 39 for the reception of earth-treating tools.

What is claimed is—

An implement of the class described comprising a hopper having an opening in its bottom, a disk rotatably mounted and projecting upwardly through the opening and into the hopper, said disk having a peripheral groove and spaced pockets in the bottom of the groove, a plate slidably mounted upon the bottom of the hopper and having one end formed to fit the groove of the disk, a fixed nut on the front of the hopper, an adjusting-screw engaged with the nut and passed into the hopper and having its inner end in threaded engagement with the plate to adjust the plate when the screw is rotated, said screw having its head lying outside of the hopper and a second plate fixed to the bottom of the hopper and having its end fitted in the groove of the disk opposite to the first-named plate.

In testimony whereof I have signed my name to this specification in the presence of two subscribing witnesses.

WILLIAM W. PICKORN. [L. S.]

Witnesses:
IRA D. REGISTER,
T. W. GRACE.